March 1, 1938.   G. A. LYON   2,109,670
COMBINATION TIRE AND WHEEL HUB COVER
Filed Jan. 2, 1932
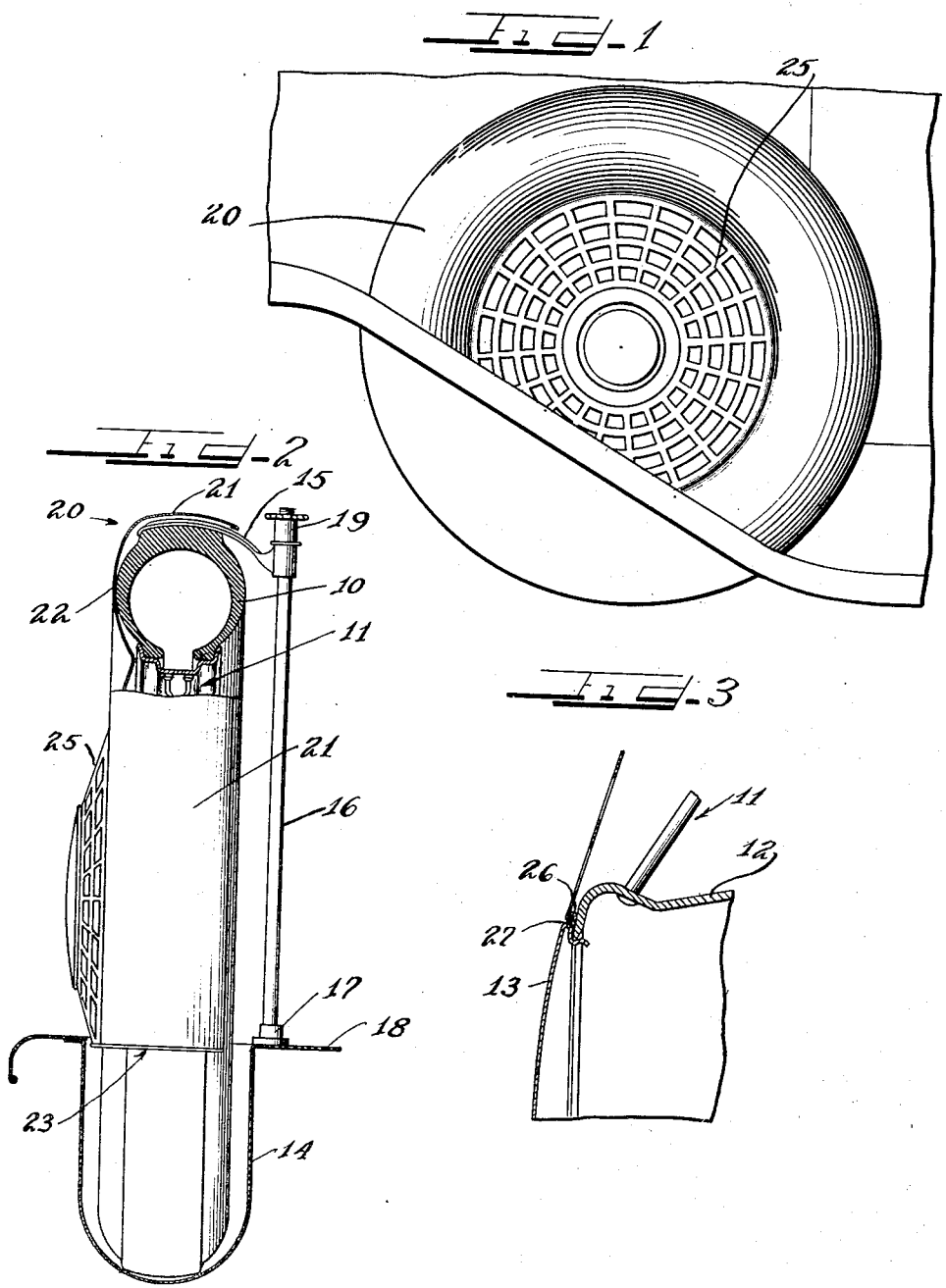
George Albert Lyon.

Patented Mar. 1, 1938

2,109,670

UNITED STATES PATENT OFFICE 2,109,670

COMBINATION TIRE AND WHEEL HUB COVER

George Albert Lyon, Allenhurst, N. J., assignor to Lyon Incorporated, Asbury Park, N. J., a corporation of Delaware Application January 2, 1932, Serial No. 584,566

5 Claims. (Cl. 150—54)

This invention relates to spare tire and wheel covers and more particularly to a spare tire cover for application to a spare tire and wheel carried in the conventional fender well of an automotive vehicle.

It is the object of this invention to provide a tire cover for a spare tire and wheel which not only includes covering means for the exposed portions of the tread and outer side wall of the spare tire but also includes a central portion for disposition at the center of the wheel and formed for cooperation with the hub cap of the wheel carrying the tire.

In accordance with the general features of this invention, there is provided a tire cover including tread and side portions for covering the exposed portions of the tread and outer side wall of the spare tire and a central disc-like portion associated with the side portion, and having its inner marginal edge formed for cooperation with the hub cap of the wheel carrying the tire whereby said disc portion may be interlocked with the hub cap and hub of the wheel.

Other objects and features of this invention will more fully appear from the following detailed description taken in connection with the accompanying drawing which illustrates a single embodiment thereof, and in which Figure 1 is a side view of my cover illustrating it applied to a spare wheel carried in a fender well of an automotive vehicle;

Figure 2 is an end view of the construction shown in Figure 1 with parts of the cover in section; and Figure 3 is an enlarged fragmentary sectional view taken through the inner marginal edge of the central disc-like portion of the cover as well as through the hub and hub cap of the wheel, and illustrating the manner in which the disc-like portion is secured to the hub by the hub cap of the wheel.

On the drawing:

The reference character 10 designates generally an automobile tire carried by a conventional wire wheel 11 including the usual central hub 12 having in cooperation therewith a conventional hub cap 13. This hub cap 13, which is well known in the automobile industry, is of the type adapted to be carried in the wheel hub or shell of a wheel and which is detachable to afford access to the interior of the hub and to the usual bolts for fastening the wheel in place.

The spare tire 10 and its wheel 11 are disposed in the usual fender well 14 of the automotive vehicle. This tire and wheel is held in the fender well by a curved clamping arm or shoe 15 in engagement with the top of the tread of the tire as shown in Figure 2, which arm 15 is mounted on the upper end of a rod 16 secured at 17 to the apron of the fender 18. The upper end of the rod 16 has threadedly disposed thereon a clamping member or nut 19 adapted to be screwed downwardly on the rod 16 to force the clamping arm 15 into tight engagement with the tire whereby the tire is firmly held in place in the fender well 14. If it is desired, the clamping nut 19 may be suitably interlocked with the threaded upper end of the rod 16 so as to prevent unauthorized removal of the clamping arm 15. Further, it will be noted that the clamping arm 15 is adapted to be disposed between the cover and the tire so as to not interfere with the smooth finish afforded by the cover which is designated generally by the reference character 20.

The cover 20 includes an arcuate rim portion 21 for disposition about the exposed portion of the tread of the tire. This rim portion 21 extends transversely across substantially the entire width of the tread and terminates at its outer side in an arcuate side portion 22 for disposition over the exposed portion of the outer side wall of the tire. The two portions 21 and 22 are integral and are each of a convexly curved cross section.

Now it will be noted from Figures 1 and 2 that the two arcuate portions 21 and 22 together form a split arcuate ring, the ends of which terminate at the mouth of the fender well 14 as indicated at 23 in Figure 2. These ends 23 of the split rim extend only a very slight distance into the mouth of the well 14 so that the cover may be flexed over the tread of the tire when it is desired to remove the cover from the tire. It will also be noted that the ends 23 of the split ring-like cover 20 extend past the half-way point of the tire, or in other words, the ring-like cover is of such circumferential length as to extend around more than 180° of the tire. This ring may be made of any suitable relatively rigid sheet material or the like which, when fabricated into the cover, will provide a cover which is substantially self-sustaining and not collapsible.

The inner marginal edge of the side portion 22 of the cover terminates in a disc-like central portion 25 which may be formed integral with the side portion 22 if it is so desired. This disc-like portion 25 is perforated as is evident from Figures 1 and 2 and has a central opening 26 adapted to be aligned with the hub 12 of the wheel.

The inner edge of this disc-like portion 25 is inturned as indicated at 26 so as to have secured to it a rubber bead 27 (Figure 3). This inturned edge 26 and rubber bead 27 is adapted to be engaged by the outer marginal portion of the hub cap 13 so that the hub cap 13 is enabled to clampingly hold this inner edge of the disc portion 25 in tight cooperation with the outer extremity of the hub 12.

This cover of my invention may be readily applied to the spare tire by flexing its ends 23 whereby it may be shoved over and onto the tire into proper tire protecting position. When it is in this position the inner marginal edge 26 of the disc portion 25 will be disposed in proximity to the central opening of the hub 12 so that upon application of the hub cap 13 to the hub 12 the outer marginal portion of the hub cap 13 serves to clampingly engage this edge 26 to secure it to the hub 12.

Now, it is of course to be understood that although I have illustrated and described in detail the preferred embodiment of this invention, the invention is not to be thus limited but only insofar as defined by the scope and spirit of the appended claims.

I claim as my invention:

1. In combination in a spare wheel assembly, a spare tire and wheel including a hollow central wheel hub and a hub cap in holding cooperation therewith, and a spare tire cover including a ring-like side portion for disposition over a side of the tire and wheel and having its inner marginal edge interlocked with the cap on said wheel hub so as to aid in centering said side portion on the wheel.

2. In combination in a spare wheel assembly, a spare tire and wheel including a hollow central wheel hub and a hub cap in holding cooperation therewith, and a spare tire cover including a ring-like side portion for disposition over a side of the tire and wheel and having its inner marginal edge interlocked with the cap on said wheel hub by being held between the hub cap rim and the wheel hub so that said side portion is centrally clamped to the wheel.

3. A spare tire cover for use in connection with a conventional spare wheel including a recessed hub and which is adapted to be secured to a support such as an axle or the like, said cover comprising a metallic sheathing arranged when in service to engage over the tire tread and having a front drum portion apertured at its center with an aperture adapted to be in alignment with and adjacent the recess in the wheel hub, and a removable hub cap for covering said recess and which may be removed to give access to the wheel hub, said front drum portion having its inner marginal edge interlocked by the cap with said wheel hub so as to aid in centering and clamping said portion on the wheel and said hub cap being constructed to fit into said spare tire cover aperture and in the wheel hub so as to be used on a covered tire and wheel when used as a spare wheel and on the same tire and wheel when uncovered and in use on an axle of the vehicle.

4. In combination, a spare tire cover for use in connection with a conventional spare wheel including a central hub adapted to be fastened to a support such as an axle or the like, said cover comprising a metallic sheathing arranged when in service to extend about the tire tread and having a front drum portion provided with a central aperture adapted to be in substantial alinement with and adjacent the wheel hub and a removable hub cap to fit over said wheel hub and which may be removed to give access to said hub, said front drum portion having its inner marginal edge interlocked by the cap with said wheel hub so as to aid in centering and clamping said portion on the wheel and said hub cap being constructed to fit into said covered aperture and into the wheel hub so as to be used on a covered tire and wheel when used as a spare wheel and on said tire and wheel when uncovered and in use on an axle on a vehicle.

5. In combination, a cover for use in connection with a conventional wheel including a central hub adapted to be fastened to a support such as an axle or the like, said cover comprising a circular metallic disk portion provided with a central aperture adapted to be disposed in substantial alinement with and adjacent the wheel hub, and a removable hub cap to fit over said wheel hub and which may be removed to give access to the hub, said disk portion having its inner marginal edge interlocked by the cap with said wheel hub so as to aid in centering and clamping said portion on the wheel and said hub cap being formed to fit in said central aperture of the cover disk portion as well as to fit said central wheel hub when said disk portion is removed from the wheel.

GEORGE ALBERT LYON.